United States Patent [19]

Sheth et al.

[11] Patent Number: 5,550,192

[45] Date of Patent: *Aug. 27, 1996

[54] DYEABLE POLYOLEFIN COMPOSITIONS AND DYEING POLYOLEFIN COMPOSITIONS

[75] Inventors: Paresh J. Sheth, Sugarland; Venkatramana Chandrashekar, League City; Roger R. Kolm, The Woodlands, all of Tex.

[73] Assignee: Lyondell Petrochemical Company, Houston, Tex.

[*] Notice: The term of this patent shall not extend beyond the expiration date of Pat. No. 5,468,259.

[21] Appl. No.: 384,716

[22] Filed: Feb. 3, 1995

Related U.S. Application Data

[63] Continuation-in-part of Ser. No. 254,974, Jun. 7, 1994, abandoned, which is a continuation-in-part of Ser. No. 154,682, Nov. 18, 1993, Pat. No. 5,468,259, which is a continuation-in-part of Ser. No. 987,010, Dec. 7, 1992, abandoned.

[51] Int. Cl.$^6$ .................. D06P 3/79; D01F 6/46; D01F 6/52; C08L 23/12

[52] U.S. Cl. .................. 525/194; 525/227; 8/497; 8/928; 524/83; 524/88; 524/107; 524/190; 524/260; 524/358; 524/523

[58] Field of Search .................. 8/497, 928; 525/194, 525/227; 524/83, 88, 107, 190, 260, 358, 523

[56] References Cited

U.S. PATENT DOCUMENTS

| | | |
|---|---|---|
| 3,156,743 | 11/1964 | Coover et al. . |
| 3,361,843 | 1/1968 | Miller et al. . |
| 3,373,222 | 3/1968 | Armstrong . |
| 3,373,223 | 3/1968 | Armstrong . |
| 3,373,224 | 3/1968 | Mesrobian et al. . |
| 3,395,198 | 7/1968 | Taniguchi et al. . |
| 3,433,573 | 3/1969 | Holladay, et al. . |
| 3,433,853 | 3/1969 | Earle et al. . |
| 3,454,512 | 7/1969 | Ahmed et al. . |
| 3,653,803 | 4/1972 | Hammer .................. 8/100 |
| 3,879,492 | 4/1975 | Bontinick .................. 161/190 |
| 4,035,438 | 7/1977 | Nielinger . |
| 4,078,014 | 3/1978 | Starkweather, Jr. et al. . |
| 4,154,647 | 5/1979 | Rave .................. 162/146 |
| 4,174,358 | 11/1979 | Epstein .................. 525/183 |
| 4,234,656 | 11/1980 | Amembal et al. .................. 525/222 |
| 4,368,295 | 1/1983 | Newton et al. .................. 525/166 |
| 4,377,616 | 3/1983 | Ashcraft et al. .................. 428/213 |
| 4,510,743 | 4/1985 | de Kroon .................. 57/260 |
| 4,557,958 | 12/1985 | Barkis et al. .................. 428/36 |
| 4,615,941 | 11/1986 | Lu .................. 428/327 |
| 4,636,436 | 1/1987 | Clementini et al. .................. 428/364 |
| 4,780,505 | 10/1988 | Mashita et al. .................. 525/66 |
| 4,782,110 | 11/1988 | Wolfe, Jr. .................. 525/194 |
| 4,853,290 | 8/1989 | Yanidis .................. 428/516 |
| 4,988,764 | 1/1991 | Nishio et al. .................. 525/66 |
| 5,006,601 | 4/1991 | Lutz et al. .................. 525/66 |
| 5,017,658 | 5/1991 | Noma et al. .................. 525/195 |
| 5,147,931 | 9/1992 | Sakuma et al. .................. 525/66 |
| 5,162,422 | 11/1992 | Lausberg et al. .................. 524/504 |
| 5,179,164 | 1/1993 | Lausberg et al. .................. 525/179 |
| 5,234,993 | 8/1993 | Huynh-Ba .................. 525/66 |
| 5,237,003 | 8/1993 | Otawa et al. .................. 525/66 |
| 5,238,990 | 8/1993 | Yu et al. .................. 524/504 |
| 5,468,259 | 11/1995 | Sheth .................. 525/227 |

FOREIGN PATENT DOCUMENTS

| | | |
|---|---|---|
| 0000783A3 | 8/1978 | European Pat. Off. . |
| 60-202141 | 10/1985 | Japan . |
| 902809 | 8/1962 | United Kingdom . |
| 2141719 | 1/1985 | United Kingdom . |
| WO85/05216 | 11/1985 | WIPO . |

OTHER PUBLICATIONS

A Focus on Polypropylene Fibers in Upholstery; Paper presented by Floyd Hill Amoco Fabrics & Fibers, Nov. 3–4, 1993.

Polypropylene Fibers, Science and Technology authored by Mike Ahmed located at the NC State Burlington Library.

*Primary Examiner*—David Buttner
*Attorney, Agent, or Firm*—Browning, Bushman, Anderson & Brookhart

[57] ABSTRACT

Disperse dyeable compositions of ethylene alkyl acrylate grafted onto polypropylene are provided. A process for disperse dyeing polypropylene fibers is provided. This process comprises (a) extruding the polypropylene with about 2 to 10% by weight of a thermoplastic copolymer of ethylene and alkyl acrylates having one to four carbon atoms in the alkyl group into fibers, and (b) exposing the fibers to a disperse dye bath containing a selected disperse dye.

45 Claims, No Drawings

DYEABLE POLYOLEFIN COMPOSITIONS AND DYEING POLYOLEFIN COMPOSITIONS

This is a continuation-in-part of application Ser. No. 08/254,974, now abandoned, filed on Jun. 7, 1994, which is a continuation-in-part of Ser. No. 08/154,682 filed on Nov. 18, 1993, now U.S. Pat. No. 5,468, 259, which is a continuation-in-part of Ser. No. 07/987,010 filed on Dec. 7, 1992, now abandoned.

FIELD OF THE INVENTION

This invention relates to novel dyeable polyolefin compositions, and more particularly, to novel disperse dyeable polyolefin fibers, and to processes for disperse dyeing such fibers.

BACKGROUND OF THE INVENTION

Polyolefins are hydrophobic and difficult to dye in that they lack dye sites to which dye molecules may become attached. One approach to color polyolefin fibers has been to add colored inorganic salts or stable organometallic pigments to polymer melts prior to fiber spinning. Nonvolatile acids or bases or materials such as polyethylene oxides or metal salts have been added to polymers prior to fiber formation to increase the affinity of the fiber for disperse, cationic, acid or mordant dyes. Polyolefin fibers are said to be grafted chemically with appropriate monomers after fiber formation to improve dyeability. *Textile Fibers, Dyes, Finishes, and Processes: A Concise Guide,* by Howard L. Needles, Noyes Publications, 1986, p. 191. An example of efforts to impart acid dyeability to polyolefins, and particularly polypropylene, has been nitrogen-based polymer additives. For example, in U.S. Pat. No. 3,361,843 issued to Robert Miller and Frederick C. Loveless on Jan. 2, 1968, various incompatible, basic nitrogen-based polymers are added to polypropylene, given a treatment with high concentrations of certain acidic chemical reagents and then dyed in an acid dye bath. U.S. Pat. No. 3,433,853 issued to Ralph H. Earle, Alfred C. Schmalz and Charles A. Soucek on Mar. 18, 1969 is similar. According to U.S. Pat. No. 3,653,803, issued to Clarence F. Hammer on Apr. 4, 1972, and assigned to a common assignee of U.S. Pat. No. 3,433,853, dyeing of the polypropylene fiber is somewhat improved by the method of U.S. Pat. No. 3,361,843, but processing of the fiber is difficult due to the incompatible polymer, the dye fastness properties are not reliably reproducible, and tinctorial strengths are not commercially sufficient. In U.S. Pat. No. 3,395,198 issued to Isaji Taniguchi et al. on Jul. 30, 1968, and U.S. Pat. No. 3,653,803, various compatible nitrogen-containing copolymers of ethylene and an aminoalkyl acrylate compound are disclosed which, when blended with polyolefins, render fibers formed from the blend acid dyeable. In U.S. Pat. No. 3,653,803, the compatible nitrogen-containing polymers are as disclosed in U.S. Pat. No. 3,395,198. In U.S. Pat. No. 5,017,658, issued to Takeshi Noma on May 21, 1991, a fiber finishing agent is used in melt spinning dyeable polypropylene fibers obtained by blending a copolymer of an ethylene aminoalkyl acrylate with polypropylene.

In U.S. Pat. No. 4,557,958, issued Dec. 10, 1985 to Edward D. Barkis, et al, a blend of 70 weight percent polypropylene homopolymer and 30 weight percent ethylene-methylacrylate copolymer is applied to a fabric of woven polyolefin as a coating stripe to prevent fraying of the fabric when the fabric is cut.

In U.S. Pat. No. 4,853,290, issued to Apostol Yanidis on Aug. 1, 1989, a blend of ethylene-acrylic acid copolymer and ethylene-methylacrylate copolymer is coextruded onto a polypropylene film to serve as an adhesive or tie layer to a second polymer applied to it.

In U.S. Pat. No. 4,782,110, issued to James R. Wolfe, Jr. on Nov. 1, 1988, melt processible multi-phase thermoplastic compositions are described which can be formed into various shapes by compression molding, injection molding, blow molding and extrusion, and said to be useful for automotive parts, e.g. automotive boots, seals, gaskets, tubing, reinforced hose, film and sheeting. The composition comprises a blend of (a) 15–75 parts by weight of a crystalline polyolefin resin forming the continuous phase of the composition, and (b) 25–85 parts by weight of a crosslinked elastomer of an ethylene alkyl acrylate copolymer consisting essentially of units derived from ethylene, an alkyl ester of acrylic acid wherein the alkyl group contains 1–6 carbon atoms, and a monoalkyl ester of 1,4-butenedioic acid wherein the alkyl group contains 1–6 carbon atoms, forming the discontinuous phase of the composition.

U.S. Pat. Nos. 3,373,222 and 3,373,223 each issued on Mar. 12, 1968 to Robert G. Armstrong disclose polymeric blends comprising polyolefin resin, polyamide resin, and either a carboxylated polyethylene, an ethylene-acrylic or a methacrylic acid copolymer. Homogeneous polymeric blends have utility in the preparation of films useful in the packaging industry, and in the preparation of plastic bottles and other containers which require a high degree of impermeability.

U.S. Pat. No. 3,454,215 issued Jul. 8, 1968 to Mukhtar Ahmed comprises a dyeable polypropylene composition comprising a polyamide an ethylene copolymer. The composition may consist of a uniform admixture of polypropylene, a low molecular weight thermoplastic unreactive polyamide, and an additional polymer selected from a group consisting of copolymers of ethylene and an ethylenically unsaturated ester of a saturated fatty acid or a hydrolyzed product of such copolymers. U.K. Patent specification 998, 439 to E. I. DuPont de Nemours and Company published on Jul. 14, 1965 also discloses a thermoplastic composition comprising polyamides and olefin copolymers.

U.S. Pat. Nos. 3,122,410 and 3,178,405 disclose the use of blue 79, red 167, and orange 30 to dye polyester, acetate, triacetate, polyacrylonitrile and PVA materials.

A chapter entitled "Dyeing of Polypropylene Fibers" in the book "Polypropylene Fibers, Science and Technology" by Mike Ahmed provides a comprehensive study of the technology involved in dyeing polypropylene fibers in the mid 1950's to the 1980's. Section IV. 1 regarding mordant-dyeable fibers discusses problems relating to light fastness, wash fastness, and crock fastness of certain dyes. The following section discusses disperse-dyeable fibers, and indicates that the fastness properties of disperse-dyeable polypropylene fibers generally is unacceptable to the textile trade.

An article entitled "Surface Dyeable Modified PP BCF Yarns" Chemiefasern/Textilindustrie, Vol. 41/93, October 1991 discusses adding a modifier to PP BCF yarn. A brochure entitled "Polymer Compounding" by Eastman Chemical Products, Inc. discusses Epolene E-43 wax as a compatibilizer for nylon/polypropylene composites. An article entitled "Morphological and Mechanical Properties of Extruded Polypropylene/Nylon- 6 blends" by Van Gheluwe et al. discusses nylon and polypropylene blends using Zytel 211 as a compatibilizer. An article entitled "New Functional Materials for Absorbent Products" by Dr. Suzuki, The New Nonwoven World, Fall 1993, discusses new polypropylene materials for absorbent products.

In an article entitled *"Polymer Morphology on the Dyeing Properties of Synthetic Fibers,"* Keith Sulbstone reviews some of the prior art efforts conducted with regard to proposing morphological changes in the fiber production for marginal dye uptakes in polypropylene. Other relevant articles are *"Dyeing Synthetic Fibers,"* H. E. Schroeder, C&EN, Sep. 10, 1956, *"Dyes for Hydrophobic Fibers,"* H. E. Schroeder et al., Textile Research Journal, Vol. XXVII, April 1957, and *"The Influence of Polymer Morphology on the Dyeing Properties of Synthetic Fibers,"* Keith Silkstone, Rev. Prog. Coloration, Vol. 12, 1982.

SUMMARY OF THE INVENTION

According to the present invention, there are provided novel compositions and articles of polyolefins that are dyeable with disperse dyes, novel methods of disperse dyeing polyolefin articles, and novel shaped dyed articles, including novel dyed polypropylene fiber, produced by such processes.

A novel polyolefin fiber comprises about 98% to 70% by weight of a polypropylene and a selected amount of an ethylene copolymer comprising about 70 to 82% by weight ethylene and about 30 to 18% by weight of an alkyl acrylate wherein the alkyl has one to four carbon atoms, said composition containing 0.2 to 3.0% alkyl acrylate by weight the sum of the polypropylene and ethylene copolymer, wherein at least a portion of said copolymer is grafted onto said polyolefin, and an effective amount of a selected disperse dye diffused into the polypropylene to produce a colored fiber.

A novel polyolefin fiber comprises about 98 to 70% by weight of a polyolefin and a selected amount of an ethylene copolymer incorporated into the polypropylene to form an alloy, said ethylene copolymer comprising about 70 to 82% by weight ethylene and about 30 to 18% by weight of an alkyl acrylate wherein the alkyl has one to four carbon atoms, said alkyl acrylate present in an amount 0.2 to 3.0% by weight; and an effective amount of a selected disperse dye diffused into the polypropylene to produce a colored fiber.

A novel process for dyeing shaped articles based on a polyolefin comprises (a) forming into a fiber a composition of about 98 to 70% by weight of a polyolefin and a selected amount of an ethylene copolymer comprising about 70 to 82% by weight ethylene and about 30 to 18% by weight of an alkyl acrylate wherein the alkyl has one to four carbon atoms; and (b) exposing the fiber to a disperse dye.

A novel process for dyeing fibers based on polypropylene comprises (a) combining polypropylene with a selected amount of an ethylene copolymer of about 70 to 82% by weight ethylene and about 30 to 18% by weight of an ethylene alkyl acrylate wherein the alkyl group has one to four carbon atoms, to form a composition; (b) extruding the composition into fibers; and (c) exposing the fibers to a selected disperse dye bath containing a disperse dye.

The selected dispersed dye allows for the cost-effective production of fibers which preferably have good light fast in at least some instances, good wash fast, and good crocking (bleeding) properties. Generally, the selected dye will have a comparatively high mass to polarity ratio, and will be only slightly polar. The rate of dyeing is inversely proportional to the mass of the dye and directly proportional to the linearity and absence of bulky side chains. A dye having low solubility in water and high solubility in fiber is preferred. Dyes generally intended for dyeing acetate fibers or polyester fibers are likely candidates. An open amorphous fiber structure is also preferred.

The polyolefin in these compositions and processes preferably is isotactic polypropylene or random copolymers of polypropylene having a minor secondary component. In the processes, the composition may be a blend or one in which at least a portion of the ethylene copolymer is grafted onto said polyolefin.

The ethylene copolymer in the compositions include ethylene methyl acrylate, ethylene ethyl acrylate, and ethylene butyl acrylate.

DETAILED DESCRIPTION OF THE INVENTION

Polyolefins useable in accordance with this process are crystalline polyethylene, polypropylene, or copolymers thereof, having melt indices in the range from about 0.7 to about 80 g/10 min. The most important polyolefin for use in formation of fibers at this time is isotactic polypropylene or random copolymers thereof, which is rendered dyeable by the process of the present invention, and is commercially available from many sources. The polypropylene can contain the usual thermal, oxidative and ultraviolet light stabilizers.

Polyolefins are not dyeable by acid dyes since they lack basic sites with which the dye may form a complex of low solubility. In the present invention polypropylene is rendered dyeable by uniformly blending it into a polypropylene composition with 2 to 30% by weight, suitably 2 to 15%, preferably 4 to 13%, most preferably about 10%, of a copolymer of ethylene and an alkyl acrylate. Alternatively, and in accordance with this invention, the copolymer of ethylene and an alkyl acrylate is grafted onto the polypropylene, and the composition may include both grafted and blended ethylene alkyl acrylate copolymer. The carboxyl of the ester group of the ethylene alkyl acrylate copolymer is believed to provide sites which will form hydrogen bonding complexes with disperse dyes. An advantage of the ethylene alkyl acrylate copolymer is that it is both thermoplastic and compatible with polypropylene so that processing difficulties are minimized or prevented. The term "compatible" means that, although sometimes discrete particles in the polypropylene composition matrix are observable under an optical microscope at a magnification of times 250 to 500, they do not interfere with downstream processing.

The ethylene copolymer comprising ethylene and an alkyl acrylate in the compositions used in this invention include ethylene methyl acrylate, ethylene ethyl acrylate, and ethylene butyl acrylate. Ethylene methyl acrylate copolymer ("EMA") alone or in blends has been used in film, extrusion coating, sheet, molding, tubing, profile extrusion and coextrusion areas. Compared to low density polyethylene homopolymer, it has a lower softening temperature (138° F.), a reduced flexural modulus, and improved environmental stress crack resistance. It is thermally stable and can be processed at extrusion coating temperatures of 600° F. to 630° F. It is said to have been used as a blending component with low density polyethylene, polypropylene, polyester, and polycarbonate to improve impact strength and toughness, to increase heat seal response and promote adhesion, to reduce stiffness, and to increase the surface coefficient of friction.

Ethylene ethyl acrylate copolymer ("EEA") resins are tough, flexible copolymers that have found application in profile extrusion specialty hose and tubing applications, gasketing, and bumpers; film applications include disposable examination gloves for doctors and dentists, balloons, etc. EEA has been used for hot melt adhesives. As the ethylacrylate content of EEA increases, the copolymers become more flexible, tougher, and more resilient. The polarity of high ethylacrylate resins is said to enhance surface acceptance of inks and provide adhesive properties.

Ethylene butyl acrylate ("EBA") is used for low melt-index films. It produces a tough film at low temperatures and is employed mainly in the packaging of frozen foods. *Modern Plastics,* Mid-October Encyclopedia Issue, 1991, pp. 68, 71–72.

Particularly preferred copolymers are the ethylene methyl acrylate random copolymers of ethylene and methylacrylate and the ethylene ethyl acrylate random copolymers of ethylene and ethylacrylate. The EMA copolymers preferably contain about 20 to 24% and preferably about 20% by weight of methylacrylate. The EEA copolymers preferably contain about 15 to 30% by weight of the ethylacrylate moiety. These copolymers have a melt index of 1 to 20, preferably about 18; and have a thermal stability such that when the temperature is raised at 10° C./min., under flowing nitrogen, less than 0.75% of the copolymer weight is lost at 300° C.

It is a critical feature of the present invention that the amount of alkyl acrylate in the polypropylene ethylene alkyl acrylate copolymer be present in an amount between 0.2% to 3.0% by weight in order to produce a textile fiber having commercially acceptable processing characteristics. If the amount of alkyl acrylate component is increased such that the ethylene component is above about 10%, a textile fiber produced therefrom loses its necessary polypropylene characteristics, degrades during high-speed fiber processing and produces a final fiber with unacceptably low tenacity (less than about 1.5 grams/denier) and excessive elongation and with significantly different melt characteristics to be commercially unacceptable. At an alkyl acrylate content above 3.0% with an ethylene component above about 10% the fiber fuses together on the heated drawing rolls and is basically unspinnable on modern commercial scale equipment. These subtle, yet commercially critical, limitations were completely unexpected.

An alkyl acrylate component of less than 0.2% produces a fiber with insufficient dye performance character to accept a desired even deep color. Accordingly, the maximum amount of alkyl acrylate component is preferred subject to acceptable fiber production and performance character. The more preferred alkyl acrylate component is between 0.5 to 3.0% by weight, with 1.5 to 2.5% being most preferred.

It is understood that polymer additives, such as thermal, oxidative and ultraviolet light stabilizers, which are typically found in fiber-forming polymer compositions may be added without departing from the present invention. The percent by weight values given in this application herein are expressed as a percent by weight of the sum of the polypropylene and alkyl acrylate copolymer. Accordingly, if nylon and/or a filler material were added to the polypropylene/alkyl acrylate copolymer mixture, the ratio of the polypropylene and alkyl acrylate copolymer would not be affected since the "base" mixture has not changed. Such additives are commonly included in a polypropylene/copolymer composition to dilute the polymer composition.

As discussed, the ethylene copolymers utilized in the present invention contain at least 70% ethylene with the alkyl acrylate component present between 2 to 30%, typically between 18 to 24%, depending upon the selected alkyl acrylate. Depending upon the amount of alkyl acrylate component present in the ethylene copolymer, the ratio of ethylene copolymer to polypropylene can be easily adjusted to maintain the proper amount of alkyl acrylate in the final product. It is also important that the amount of ethylene contributed by the ethylene copolymer be maintained below about 10%. Accordingly, it is preferred that the higher the percentage of alkyl acrylate in the copolymer, the easier it is to obtain the proper balance of components. By way of example, a mixture of 90% polypropylene and 10% ethylene methyl acrylate having a 24% methyl acrylate component produces a polypropylene/ethylene methyl acrylate copolymer composition having a methyl acrylate component of about 2.4%. Similarly, a 3% addition of the same ethylene methyl acrylate copolymer produces a methyl acrylate component of 0.72%. In both cases the ethylene component attribute to the copolymer is less than 10%.

It has been found desirable in some applications to blend a polyamide, such as nylon 6 or nylon 6, 6, into a first composition (a polypropylene and ethylene copolymer composition) to further enhance the first composition without sacrificing the desired spinning or dyeing properties of the fiber. The addition of polyamide forms a second composition (e.g., a polypropylene/copolymer/nylon 6 composition) with improved flammability, improved tenacity and improved resiliency compared to the first composition, even to a point that the modified fiber is more resilient than polypropylene alone. The added polyamide is by weight about 1 to 20%, and preferably 5 to 15%, the weight of the first composition. When a nylon component is added it may substitute for a part of the ethylene copolymer as long as the alkyl acrylate component doesn't drop below an amount sufficient to keep the otherwise immiscible polypropylene and polyamide from separating (usually about 0.5%). A preferred composition when polyamide is included is about 1.4% alkyl acrylate component (approximately 7% ethylene copolymer) and 15% nylon 6 with the remainder (approximately 93%) polypropylene. For this one preferred composition, the alternatively expressed phr values are 100 phr polypropylene, 7.5 phr ethylene copolymer, and 20 phr nylon.

In using a composition of the polypropylene and ethylene-alkylacrylate copolymer in carrying out the dyeing procedure of this invention, it is important that the polypropylene and ethylene-alkylacrylate copolymer be uniformly incorporated prior to forming the composition into a shaped article. The combination may be only a uniform blend, but preferably, and in accordance with this invention, it is a composition in which at least a portion of the ethylene alkyl acrylate is grafted onto the polypropylene. Whether by blending and/or grafting, incorporation can be accomplished in a separate step prior to forming, or the blending and/or grafting and extrusion can be carried out in the same operation if the extruder has a suitable mixing section. Poor blending and/or grafting can result in uneven dyeing even if the remaining steps of dyeing procedure are properly conducted.

The grafting of ethylene alkyl acrylate copolymer to polyolefin polymer, preferably isotactic polypropylene, for use in this invention is accomplished by subjecting the ethylene alkyl acrylate copolymer to co-graff polymerization in the presence of the polyolefin polymer. The graff polymerization method is not critical and the graff polymerization can be effected according to conventional methods employing organic free radical initiators. The polymerization conditions may be those known to the art. The organic radical-generating agent used in this invention includes:
2,5-dimethyl-2,5-di(t-butylperoxy)hexane-3,
2,5-dimethyl-2,5-di(t-butylperoxy)hexane,
1,3-bis(t-butylperoxyisopropyl)benzene,
2,2-bis(t-butylperoxy)-p-diisopropylbenzene,
dicumyl peroxide,
di-t-butyl peroxide,t-butyl benzoate,
1,1-bis(t-butylperoxy)-3,3,5-trimethylcyclohexane,
2,4-dichlorobenzoyl peroxide,
benzoyl peroxide,
azobisisobutyronitrile and the like.

Preferred are:
2,5-dimethyl-2,5-di(t-butylperoxy)hexane,
1,3-bis(t-butylperoxyisopropyl)benzene and
2,2-bis(t-Butylperoxy)-p-diisopropylbenzene.

The thermoplastic resin composition of this invention can be obtained by adding 0.01 to 0.3 pans by weight, preferably 0.05 to 0.2 pans by weight, of an organic radical-generating agent to 100 pans by weight of a mixture consisting of 98 to 70% by weight, preferably 96 to 90% by weight of polypropylene, and 2 to 30% by weight, and preferably 4 to 10% by weight, of an ethylene alkyl acrylate copolymer, and then subjecting the resulting mixture to thermal treatment in a mixer (e.g., a Banbury mixer, a kneader) or an extruder at 170° to 300° C., preferably 180° to 250° C., for 0.2 to 30 minutes, preferably 0.5 to 20 minutes.

The uniform combination of polypropylene and ethylene-alkyl acrylate copolymer is formed into the desired fibers by any of the known techniques, such as melt spinning. The present invention is particularly useful with fibers and fibers of various deniers can be adequately dyed with good dye utilization. When a degree of orientation is increased, at a given melt flow rate, for example, by a times 3 compared to a times 1.5 draw ratio, a significant increase in uptake of the dyestuff is observed. An increased degree of orientation is the result of the degree of higher draw ratios. Generally, the fibers are from 1 to 1500 denier and can be in the form of round or lobed fibers, tape or fibrillated film. Round or lobed fibers are for apparel, upholstery and carpet face yarn uses and can have a denier of about 1 to 60 without encountering dyeing problems by the present technique. These fibers can also be used in production of other articles, such as decorated ribbons or non-woven textiles. The tape fibers are generally used for carpet backing and are of heavier denier, i.e., about 500 to 1500 denier. Fibrillated film fibers are used for cordage carpet face yarn or upholstery.

For fibers to be fully penetrated by dye, the spinning and drawing processes should preferably be conducted in a manner to produce a fiber with a uniform cross-section, i.e., minimal sheath/core structural differences.

After conventional finishing, the fibers may then dyed in a disperse dye bath generally between pH 2 and pH 6, suitably between pH 4 and pH 6, using conventional disperse dyes and disperse dyeing techniques. Disperse dyes are sparingly soluble in water, and the aid of a surfactant to disperse the dye in the dye bath is preferable. When dyeing additive-modified polyolefin alone in the dye bath, the surfactant can be omitted. For best results and for good dye penetration, a non-ionic surfactant (0.1 to 100 parts per million of dyeliquor) can be optionally employed.

Physical factors such as temperature and agitation and auxiliary chemicals added to the dye bath can alter the rate of dyeing and/or the total dye absorbed by the fiber. Agitation of the dye bath speeds dye diffusion to the fiber in the dye bath. The rate of dye passage across the fiber-liquid interface is rapid in most cases, so the rate of dyeing is essentially determined by the rate of dye movement within the fiber matrix.

As known in the art, various specialized techniques have been developed for application of disperse dyes to fibers. Heretofore these applications essentially have been directed to polyester fibers. Unless the dyeing is carried out at 100° C. or above, the rate of dyeing is slow. Dyeing with disperse dyes from aqueous solutions at 120°–130° C. to achieve rapid dyeings requires the use of closed high-pressure equipment. Jet dyeing has been introduced which permits high-temperature dyeing and impingement of the dye onto the moving fabric through use of a venturi jet system. Carriers permit faster dyeing at atmospheric pressure and below 100° C.. Carriers are usually organic compounds that can be emulsified in water and which have affinity for the fiber polymer. The carriers penetrate the polymer, often swelling the fiber, and aid passage of the disperse dye across the dye solution fiber interface into the fiber. Suitable carriers include aromatic hydrocarbons such as diphenyl and methylnaphthalene, phenolics such as o- and p-phenylphenol, halogenated aromatics such as the di- and trichloro-benzenes, aromatic esters including methyl salicylate, butyl benzoate, and diethylphthalate, and benzaldehydes. Carriers must be removed after dyeing. A preferred swelling agent is of the type disclosed in PCT/US92/07827; WO 93/06177 to Shaw Industries, Inc.

Continuous dyeing is carried out on a dyeing range where fabric or carpet is continuously passed through a dye solution of sufficient length to achieve initial dye penetration. Some disperse dyes may be sublimated under heat and partial vacuum into polymer fiber, by methods known in the art. Printing of polyolefin compositions made in accordance with our invention can be accomplished with disperse dyes by heat transfer printing under pressure with sufficient heating to cause diffusion of disperse dyes into the polyolefin. Block, flat screen, and heat transfer batch processes, and engraved roller and rotary screen printing continuous processes may be used. Different dye solutions may be jet sprayed in programmed sequence onto fabric or carpet made of the compositions of this invention as the fabric passes under the jets to form patterns. Dye solution may be metered and broken or cut into a pattern of drops which are allowed to drop on a dyed carpet passing underneath to give a diffuse overdyed pattern on the carpet. Competitive dyeing of polyolefins is useful when dyeing styled carpets consisting of several different fibers such as nylon, polyester, etc. and a polyolefin. Different styling effects can be produced by controlling shade depth on each type of fiber present. Acid, disperse and premetallized dyes or combinations thereof, depending upon the fibers present, can be employed to obtain styling effects. Also, styling effects obtained from a fiber combination can be achieved by making a fabric or carpet face from polyolefin yarns containing varying amounts of ethylene alkylacrylate copolymer. Just as tweed effects can be produced in a nylon carpet by tufting with nylon fibers containing different levels of amine ends, so too can these styled, tweed effects be produced in a polyolefin fiber by controlling the concentration of ethylene alkylacrylate dye sites. Print dyeing, space dyeing, and continuous dyeing can be carried out with fabrics made from such yarns.

There are many commercially available disperse dyes. Dyes are classified based on method of application and to a lesser extent on chemical constitution by the Society of Dyers and Colorists. Various disperse dyes may be found in the listing "Dyes and Pigments by Color Index and Generic Names" set forth in *Textile Chemist and Colorist*, July 1992, Vol. 24, No. 7, a publication of the American Association of Textile Chemists and Colorists.

Dyes are intensely colored substances used for the coloration of various substrators, such as paper, plastics or textile materials. Dyes are retained in these substrates by physical adsorption, by salt or metal-complex formation or by the formation of covalent chemical bonds. The methods used for the application of dyes to the substrate differ widely, depending upon the substrate and class of dye. It is by applications methods, rather than by chemical constitutions, that dyes are differentiated from pigments. During the application process, dyes lose their crystal structures by dissolution or vaporization. The crystal structures may be some cases be regained during a later stage of the dyeing process. Pigments, on the other hand, retain their crystal or particulate form throughout the entire application procedure.

A large number of dyes, with widely differing properties, is therefore necessary because of the great variety of materials to be dyed. On a worldwide basis, it is believed that over 8000 chemically different dyes have achieved commercial significance. To assist both the dye users and dye manufacturers, dyes are therefore classified into groups two ways. The first method of classification is by chemical constitution in which the dyes are grouped according to the chromophore or color giving unit of the molecule. The second method is based on the application class of end-use of the dye.

The dual classification system used in the color index (CI) is accepted internationally throughout the dye-manufacturing and dye-using industries. In this system, dyes are grouped according to chemical class with a CI number for each chemical compound and according to usage or application class with a CI name for each dye. Disperse dyes are generally water insoluble nonionic dyes typically used for dyeing hydrophobic fibers from aqueous dispersion. They are often used on polyester, nylon, and acetate fibers.

The invention can be further understood by referring to the following examples in which parts and percentages are by weight unless otherwise indicated.

EXAMPLE 1

A polypropylene alloy composition containing 90% by weight of a commercial fiber grade of isotactic polypropylene having a melt flow rate of 18 (ASTM D-1238-89, 230° C., 2.16 lbs) and containing thermal, oxidative and ultraviolet light stabilizers and 10% by weight of a copolymer of ethylene methylacrylate is prepared by first dry mixing the polymers and then melt blending the mix in a 40 mm Berstorff extruder at 246° C. The ethylene copolymer contains 24% by weight of the methylacrylate comonomer, and has a melt index of 18 (ASTM D-1238-89, 190° C., 2.16 lbs). The resulting homogeneous, compatible polymer blend is cut into nibs after water-quenching, which are then fed to a melt spinning apparatus and 50–60 denier per filament fiber is spun at 230°–245° C. A mineral-oil based finish containing anionic surfactants is applied to the fiber bundle after spinning, but before drawing. The fibers are drawn times three to give a final denier of 18–20 per filament. The physical properties of specimens of the fibers so prepared are tested, and the test results are set forth in Table I. Specimens of the fibers are knitted on a knitting machine to produce a tubular knit fabric. Samples of the fabric are dyed according to the procedure given below.

Dye procedure steps involving a scour, dye and reduction clearing operation were used, as explained hereafter. In the scour step, the sample is rinsed in cold water for 5 minutes and the bath changed. The sample was introduced in a new bath of 0.5 g/l Keirlon TX-199 wetting agent/detergent and 0.25 g/l of soda ash, then heated to 160° F. and held for 0 minutes. After cooling to 100° F., the sample was rinsed.

In the dye step, the dye bath was prepared as follows: 1% dye, 1% Triton X-100 (surfactant), 1% Synthrapal LFP (disperse leveling agent). The pH was brought to 5.5 with acetic acid, and the bath heated to 120° C. at 2.5° C. per minute. The bath was held at that temperature of 30 minutes, then cooled to 40° C. at 3° C. per minute. The sample was rinsed warm, extracted and dried. Optionally, for good fastness properties an addition step, namely, reductive clearing/stripping, may be carried out as follows.

In the reduction clearing step, wash dyed samples are placed in a series of tanks: first tank, wet out with Triton X-100; second, third and fourth tank, reductive clearing at 70° C. with 8 g/l of sodium hydroxide at 32% concentration, 4 g/l sodium hydrosulfite for a total of 30 seconds. Rinse occurs in the fifth tank, and the sample is neutralized with acetic acid in the sixth tank. This process of reductive clearing ensures the removal of surface adhered dyes and in general produces better fastness results.

EXAMPLE 2

A polypropylene graft composition containing 90% by weight of a commercial fiber grade of isotactic polypropylene having a melt flow rate of 4 (ASTM D-1238-89, 230° C., 2.16 lbs) and 10% by weight of a grafted copolymer of ethylene methylacrylate (and containing thermal, oxidative and ultraviolet light stabilizers) is prepared by first dry mixing the polymers and then melt blending the mix in a 40 mm Berstorff extruder at 246° C. in the presence of sufficient free radical initiator peroxide, specifically, 2,5-dimethyl-2,5-di(tertiary-butyl peroxy)hexane, to visbreak the composition to a product melt flow rate of 18. The ethylene copolymer contains 24% by weight of the methylacrylate comonomer, and has a melt index of 18 (ASTM D-1238-89, 190° C., 2.16 lbs). The resulting homogeneous, compatible polymer blend is cut into nibs after water-quenching, which are then fed to a melt spinning apparatus and 50–60 denier per filament fiber is spun at 230°–245° C. A mineral-oil-based finish containing anionic surfactants is applied to the fiber bundle after spinning, but before drawing. The fibers are drawn times three to give a final denier of 18–20 per filament. The physical properties of specimens of the fibers so prepared are tested, and the test results are set forth in Table I. Specimens of the fibers are knitted on a knitting machine to produce a tubular knit fabric. Samples of the fabric are dyed according to the procedure given in Example 1.

TABLE I

| Physical Properties | (Unmodified homopolymer) | Example I (Alloy Modified PP) | Example II (Grafted Modified PP) |
| --- | --- | --- | --- |
| Denier (gms/9000 meters) | 1,450 | 1,480 | 1,460 |
| Tensile (gms/den) | 2.5 | 2.5 | 2.3 |
| Elongation (%) | 39.0 | 44.0 | 48.0 |
| Toughness (gms/den) | 0.69 | 0.75 | 0.80 |
| Energy at Break (gms/inch) | 3,980 | 4,420 | 4,675 |
| Young Modulus (gms/den) | 17.0 | 12.0 | 10.5 |

EXAMPLE 3

A polypropylene graft composition containing 93% by weight of a commercial fiber grade of isotactic polypropylene having a melt flow rate of 4 (ASTM D-1238-89, 230° C., 2.16 lbs) (and containing thermal, oxidative and ultraviolet light stabilizers) and 10% by weight of an alloyed and grafted copolymer of ethylene methylacrylate is prepared by first dry mixing the polymers and then melt blending the mix in a 40 mm Berstorff extruder at 246° C. in the presence of sufficient free radical initiator peroxide, specifically 2,5-dimethyl-2,5-di(tertiary-butyl peroxy)hexane, to visbreak the composition to a product melt flow rate of 35. The ethylene copolymer contains 24% by weight of the methylacrylate comonomer, and has a melt index of 18(ASTM D-1238-89, 190° C., 2.16 lbs). The resulting homogeneous, compatible polymer blend is cut into nibs after water-quenching, which are then fed to a melt spinning apparatus and 4 denier per filament fiber spun in a partially oriented yarn (poy) operation at a take-up speed of 3,000 rpm, and subsequently false twist textured to 2.0 to 2.5 dpf fibers. Specimens of the fibers are knitted on a knitting machine to produce a tubular knit fabric.

The physical properties of the fiber produced from the Example 4 process compared to other textile fibers of similar denier are provided in Table II below. The results were obtained from an average of 20 tensorapids and the yarn was 150 denier/46 to 48 filaments.

component in the composition, in combination with a less than about 10% by weight ethylene content attributed from the alkkyl acrylate copolymer, is required to produce the desired results sufficient to achieve commercial acceptability.

Regarding to one preferred embodiment of the invention, the ethylene copolymer is incorporated into the polypropylene to form an alloy. This incorporation may take the form of either grafting or physical blending.

Those skilled in the fiber making arts have recognized that previous attempts, such as polypropylene/EVA, cannot produce a spinnable fiber under modern fibermaking condition but instead it very quickly degrades to produce noxious amounts of acetic acid. No other known copolymers are believed to produce commercially acceptable dyeable fibers in combination with polypropylene.

A series of samples of polymer made as described in Examples 2 & 3 and were evaluated with a series of disperse dyes according to the dye procedure of Example 1. The results are set forth in Table III. Table III lists the dyes that are considered acceptable for dyeing fibers according to the present invention. Light fastness, and crock fastness tests were also performed on yarns at 2–20 deniers per filament.

TABLE II

| Yarn Type | Denier | Break Force (Kfg) | Tenacity (gpd) | Elongation (%) | Modulus MI @ 1.0%) N/tex | RECOVERY DATA Extension @ 10.0% | |
|---|---|---|---|---|---|---|---|
| | | | | | | Strain Rec. % | Work Rec. % |
| PET Control | 159 | 0.51 | 3.2 | 21 | 2.11 | 80.1 | 25.7 |
| PP Control | 143 | 0.32 | 2.2 | 20 | 0.76 | 100 | 53.1 |
| Example 4 (with nylon) | 151 | 0.28 | 1.8 | 15 | 1.08 | 89.6 | 45.1 |
| Example 4 (without nylon) | 139 | 0.35 | 2.5 | 22 | 1.36 | 90.4 | 45.7 |

While the prior art teaches the existence of polypropylene incorporated (by grafting or blending) with ethylene-alkyl acrylate copolymers, the above examples illustrates that, in only certain limited amounts, a particular ethylene copolymer has the surprising ability of making a commercially acceptable, spinnable textile fiber of polypropylene which can accept disperse dyes sufficient to produce a deeply colored fiber with superior physical properties.

Those skilled in the fiber making arts have long believed that any acrylate additive produces a resin composition which cannot be spun at modern high speed production without separation of the components. Further, the addition of many additives, including acrylates and acetates, imparts a disagreeable feel and smell to the finished fiber goods, partially as a result of degradation during the spinning and drawing process. Fiber manufacture typically imparts terrific shear forces to a polymer composition and "draw down" ratios of 20–100:1 which makes fiber forming polymers very intolerant of many additives routinely employed in compositions having other uses. Any discontinuity or lack of uniformity in a polymer composition can result in a break when the fiber is stretched or drawn down to its final, often very thin, diameter. As a consequence, those skilled in the fiber arts have generally not looked to compositions for other end uses as acceptable in fiber applications, particularly in areas where historical experience suggests unacceptability. The critical nature of the invention is appreciated in that a 0.2 to 3.0% by weight limitation on alkyl acrylate

TABLE III

| | DYE EXHAUSTION | | | |
|---|---|---|---|---|
| Experimented Dye Type DISPERSE DYES at 1% Concentration | LIGHT XENON AATCC 16 E- 40 HOURS | CROCK FASTNESS AATCC 8-1985 | | Exhaust/ Yield |
| | | DRY | WET | |
| Disperse Blue 361 | | | | 4 |
| Disperse Violet 28 | 4–5 | | | 3–4 |
| Disperse Blue 77 | | | | 3–4 |
| Disperse Yellow 23 | 5 | 5 | 5 | 4–5 |
| Disperse Yellow 54 | 4 | 5 | 5 | 4 |
| Disperse Yellow 86 | 4 | 4–5 | 4–5 | 4 |
| Disperse Yellow 232 | 1 | 4–5 | 4–5 | 3–4 |
| Disperse Yellow 3 | 5 | 5 | 5 | 3–4 |
| Disperse Blue 35 | 4 | 4–5 | 4–5 | 3–4 |
| Disperse Blue 87 | 4 | 5 | 5 | 4 |
| Disperse Blue 291 | 3–4 | 5 | 5 | 4–5 |
| Disperse Blue 354 | 1 | 4 | 4 | 4–5 |
| Disperse Blue 60 | 5 | 3–4 | 3–4 | 4 |
| Disperse Blue 118 | 4–5 | 4–5 | 4–5 | 3–4 |
| Disperse Blue 183 | 1 | | | 5 |
| Disperse Red 60 | 4–5 | 3–4 | 3–4 | 4–5 |
| Disperse Yellow 64 | 5 | | | 4–5 |
| Disperse Red 167 | 3–4 | 4–5 | 4–5 | 3–4 |
| Disperse Red 73 | 1 | 4 | 4 | 4 |
| Disperse Red 127 | 3 | | | 3–4 |
| Intrawhite FWA | 4–5 | 5 | 5 | 4–5 |

TABLE III-continued

| | | | | |
|---|---|---|---|---|
| Disperse Green 9 | 1 | 4–5 | 4–5 | 4–5 |
| Disperse Blue 79 | 1 | 4 | 4 | 3–4 |
| COMPARATIVE EXAMPLES | | | | |
| Disperse Red 338 | | | | 3 |
| Disperse Red 4 | | | | 2–3 |
| Disperse 302 | | | | 2–3 |
| Disperse Red 13 | | | | 2–3 |
| Disperse Red 227 | | | | 2 |
| Disperse Yellow 82 | | | | 2 |
| Disperse Blue 56 | | | | 3 |
| Disperse Violet 26 | | | | 2–3 |

| FASTNESS RATING: | EXHAUST RATING: |
|---|---|
| 5 — No Change | 5 — Total Exhaust |
| 4 — Slight Change | 4 — Good Exhaust |
| 3 — Noticeable change | 3 — Moderate Exhaust |
| 2 — Significant Change | 2 — Poor Exhaust |
| 1 — Severe Change | 1 — Light Staining |

Dye exhaust, set forth in the last column, has been used as the basis for identifing dyes suitable for the polymer. Since there are thousands of possible dyes that are known and are commercially available, it should be appreciated that relatively few dyes produce acceptable exhaustion when applied to the polypropylene-based fibers as disclosed herein. Of all the dyes that are known to exist, only the dyes indicated in Table III, and the relatively few analogs of those dyes as defined herein, produce acceptable results. The single most important criteria for dye selection, in contemporary times is dye exhaust. It is important that the substrate in a woven, tufted, knitted or non woven product readily pick up the dye from the bath and retain it thereby reducing environmental waste and improving economic utility of the expensive dye.

Accordingly, dye exhaust or the extent to which the textile depletes a dye bath has been used as the basis for determining the dyeability of the polyolefin. Other performance properties such as light fastness, wash fastness, and crock fastness, are more a function of many other variables such as the conditions of dyeing, the auxiliaries used in dyeing and, in general, the dye procedure and the after treatment.

Consistent with the Gray Scale Grading System devised by the AATCC, we have used a scale of 1 to 5; with 5 being a near total exhaustion of the dyestuff from the dye bath to the substrate and 1 being merely a staining of the substrate and almost all dye stuff remaining in the bath. All other grades between 5 and 1 including the intermediates such as 3–4, are based upon a linear scale of dye exhaust from the bath to the substrate. While a rating of 5 would be the most preferred, for operational purposes a rating of 3–4 or above is acceptable as a standard for a polymer fiber to be considered "dyeable" with a particular dye.

In the following paragraphs it will be hypothesized why some of these dyes have better exhaust ratings than others on the subject polymer. Also, the dyes that exhibit good exhaust herein have dye analogs that should also exhibit acceptable exhaust ratings. Analog dyes and dyes that have structures very similar to the dyes tested and found acceptable.

The reason that Disperse Yellow 3 and 23 exhaust well is that they are straight forward azo dyes; Disperse Yellow 3 is a simple azo and Disperse Yellow 23 is a simple diazo. It is believed that dyes conventionally used on acetate fibers have a reasonable chance for success, although at higher temperatures certain dyes suitable for use with polyester also work as well. Based on the excellent performance of azo dyes, yellow 3 and yellow 23, it may be inferred that dyeing with monoazo or diazo dyes that do not have a bulky side chain or highly polar groups such as a cyano group in the diazotizable amine or coupler, would be suitable dye candidates. Yellow 3 may be seen to have excellent exhaustion and light fastness. The size and geometry of these dyes are such that they have high mobility. This in general applies to the other disperse dyes found to be acceptable. An analog of Disperse Yellow 3 is Disperse Yellow 50. Analogs of Disperse Yellow 23 are Yellow 7 and Yellow 68. Yellow 3 and 23 exhibit good light fastness.

The quinaphthalone Yellow Disperse Dyes that demonstrate good exhaustion with this polymer are Disperse Yellow 54, and Yellow 64. Both are greenish yellow dyes and demonstrate good light fastness characteristics as to be expected. Yellow 54 however has poor wash fastness characteristics which is characteristic of this dye in general. An analog of these dyes is Disperse Yellow 67. The slightly better exhaust of Disperse Yellow 64 relative to Disperse yellow 54, may be explained by the additional Br atom in Yellow 64, providing a helpful boost to the polarity.

Lactone dyes such as Disperse Yellow 232 and Yellow 82 are also good candidates for this polymer. The better exhaust of Disperse Yellow 232 relative to Yellow 82 may again be explained in terms of the polarity difference. Yellow 232 has an oxygen and chlorine, while Yellow 82 has a nitrogen and no chlorine. This result further suggests that the presence of a halogen, such as Br, Cl etc., prompts better exhaustion. The light fastness characteristics of these lactone dyes are tradionally poor relative to other chemical families and this property is likewise found with this polymer. The analogs of Yellow 232 and Yellow 82 dyes are Yellow 184 and Yellow 186. Yellow 86, which is a nitrodiphenylamine dye, produces a bright color with good light fastness characteristics. Yellow 86 analog dyes consist of Yellow 33, Yellow 34, and Yellow 42. Yellow 42 is different in that there is an additional phenoxy group which could affect exhaust.

As with the yellows, the small and simple monoazo Disperse Red 73 and Red 167 are suitable for this polymer. Disperse Red 73 is a cyanoethylated monoazo and Disperse Red 167 is a diacetylated monoazo dye which have the correct size for the subject polymer. The unacetylated versions of Red 73 and Red 167, such as Disperse Red 13, has poorer exhaust than Red 73 or 167. As will be seen later, Disperse Blue 79, which is an analog of Disperse Red 167 is also preferred for this modified polyolefin. The analogs for Disperse Red 73 are Orange 25, Red 50 and orange 37. Analolgs of Red 167 are Disperse Red 274, Red 74, Red 135, Red 140, Red 155, Violet 33, Brown 18, Red 71, Violet 60, Red 131, Orange 88, Red 62, Orange 90, Orange 79, Orange 78, Brown 10, Orange 91 and Blue 79. Disperse Red 338 exhibits an odd preferential dyeing phenomenon, scavenging the red portion of the dye but leaving a bluish residue in the bath. Disperse Red 60 is the preferred anthraquinone dye. When compared against similarly structured Disperse Red 4 and Red 302, it shows better exhaustion. This may be because Disperse Red 60 has an aromatic group attached to the oxygen, whereas Red 4 and Red 302 have aliphatic groups attached to the oxygen. The light fastness characteristics of Disperse Red 60 on this polymer is good and other fastness characteristics are in line with expectations. Other Analogs of red 60 are Red 55:1, Red 53, Red 55, Red 59 and to an even closer extent, Disperse Red 207, Disperse Red 146, Disperse red 132. Disperse Red 338 is moderately good for this modified polyolefin. Disperse Red 127 also an anthraquinone dye provides good exhaust and light fastness. Disperse Red 277 however, a Benzopyran dye exhibits poor exhaust.

Similar to Azo Disperse Yellow 3 and 23, Disperse Reds 73 and 167, and Disperse Blue 79, which is diacetylated and Blue 291 and Blue 183 which are diethylated dyes, also have the correct size and geometry for dyeing of the modified polyolefin. Disperse Blue 79 is also an analog to Disperse Red 167 in that they are both diacetylated monoazo dyes.

Disperse Blue 291 and Blue 183 are analogous in structure and they are the best exhauting dyes on these fibers. Both are azo dyes and have very electronegative, weakly diazotizable amines which must be diazotised with nitrosyl-sulfuric acid. (a strong diazotising reagent). The diazotisable amines have highly electronegative nitrous and cyano groups in addition to the Br substituents which accounts for the blue color of the dye. The analogs of these dyes are Blue 281, Blue 79, Blue 94, Blue 171, Blue 139, Blue 130, Blue 122, Blue 146, Blue 165, Blue 200 and Blue 301 and Green 9. Test work with Blue 79 and Green 9 confirm the concept that closely analogous dyes perform similarly to each other on these fibers. Interestingly, the Green 9 has good exhaust, but produces a bluish product.

Anthraquinone blues, such as Blue 60 and Blue 87 which demonstrate good exhaust with this polymer closely resemble their analogs Blue 3, Blue 14, Blue 19, Blue 23, Blue 24, Blue 176, Blue 143 and Blue 198 and Violet 1, Violet 4 and Violet 6. Torquoise Anthraquinones Blues such as Blue 118 and Blue 361 which also show good exhaust with this polymer closely resemble Blue 55 and to a lesser extent Blue 35 and Blue 56, the latter two being marginal performers for exhaust with this polymer. Disperse Blue 77 is a mixture of two anthraquinones. Blue 27 is an analogue of Blue 77. While aromatic phenoxy substitutions in the second and third positions are not good for exhaust as demonstrated by Violet 26, other ring substitutions, such as pthalic anhydride substitution as in Yellow 54, and halogen substitution as in Violet 28 seems to exhibit good exhaust. Violet 38 and 46 are analogs of Violet 28.

Those skilled in the art will appreciate that in most commercial applications, the dyestuff will be a mixture of one or more of the above selected dyes, and may be a mixture of one or more above selected dyes in combination with other dyes which would be unacceptable alone. The resulting dyestuff mixture is, however, an acceptable mixture due to the presence of the selected dye or dyes. It is believed that the concentration of the selected dye or dyes should be at least 0.1% to obtain the significant benefits of the invention with dye stuffs. There is a current trend for blends of dyes to be used which optimize different characteristics of specific dyes for maximum performance. Carpets made from disperse dyed fibers from this polymer, exhibited excellent resistance to bleaching. In a bleach test it was found a typical 10% solution did not produce a change in color, whereas a 100% solution produced only a significant to moderate change in color.

Carpet samples made from the subject polymer and disperse dyed with select disperse dyes, are stain resistant as per the carpet industry's standard Kool-Aid test. On a scale of 1 to 10, the samples scored an absolute 10, indicating no stain on tested samples. Generally speaking, dye results indicate that the grafted version of the present invention taught in Example 2 and 3 show a slightly better performance than the blended copolymer version of Example 1.

While it is not desired to be bound to any particular theory of why the compositions and methods of our invention are so effective, it is speculated that the mode of attachment of dispersed dyestuff consists of hydrogen bonding of the dyestuff molecule to the carbonyl oxygen of the ester grouping in methyl acrylate. Dispersed dyestuff exhibits excellent retention indicating strong chemical affinity between the functionality in the ester group and dyestuff Various modifications to the modified polypropylene fibers and to the techniques described herein for forming and dyeing such fibers should be apparent from the above description of those preferred embodiments. Although the invention has thus been described in detail for these embodiments, it should be understood that this explanation is for illustration and that the invention is not limited to these embodiments. Alternative fibers and forming and dyeing techniques will thus be apparent to those skilled in the art in view of this disclosure, and such alternative fibers and techniques may be performed without departing from the spirit of the invention, which is defined by the claims.

What is claimed is:

1. A process for dyeing fibers based on a polypropylene, comprising:
   (a) forming into a fiber a composition of about 98 to 70% by weight of a polypropylene and an ethylene copolymer comprising about 70 to 82% by weight ethylene and about 30 to 18% by weight of an alkyl acrylate wherein the alkyl has one to four carbon atoms; said alkyl acrylate present in the composition in an amount between 0.2 to 3.0% by weight of the sum of the polypropylene and ethylene copolymer; and the ethylene from said ethylene copolymer present in the composition in an amount less than about 10% by weight of the sum of the polypropylene and ethylene copolymer;
   (b) exposing the fiber to a disperse dye.

2. The process of claim 1 wherein the disperse dye is selected from a group consisting of Blue 291, Blue 35, Blue 87, Blue 354, Yellow 54, Yellow 86, Yellow 3, Yellow 23, Yellow 232, Intrawhite FWA, Red 60, Yellow 64, Green 9, Blue 79, Red 73, Red 127, Red 167, Blue 183, Blue 118, Blue 60, Violet 28, blue 77, and Blue 361.

3. The process of claim 2 wherein the disperse dye is an azo dye selected from a group consisting of Yellow 3, and Yellow 23, Yellow 50, Yellow 7 and Yellow 68.

4. The process of claim 2 wherein the disperse dye is an azo dye selected from a group consisting of Blue 102, Blue 106 and Green 9.

5. The process of claim 2 wherein the disperse dye is an azo dye selected from a group consisting of Blue 291, Blue 183, Blue 281, Blue 79, Blue 94, Blue 171, Blue 139, Blue 125, Blue 130, Blue 122, Blue 146, Blue 200, Blue 146, Blue 165, and Blue 301.

6. The process of claim 2 wherein the disperse dye is an anthraquinone dye selected from a group consisting of Blue 35, Blue 60 and Blue 87, Blue 14, Blue 19, Blue 23, Blue 24, Blue 34, Violet 1, Violet 4, Violet 6, Blue 143, Blue 176 and Blue 198.

7. The process of claim 2 wherein the disperse dye is an anthraquinone dye selected from a group consisting of Blue 118, Blue 361 and Blue 55.

8. The process of claim 2 wherein the disperse dye is an anthraquinone dye selected from a group consisting of Red 127, Red 60, Red 11, Red 91, Red 55, Red 53, Red 55:1, Red 59, Red 207, Red 146 and Red 142.

9. The process of claim 2 wherein the disperse dye is an anthraquinone dye selected from a group consisting of Yellow 54, Yellow 64 and Yellow 67.

10. The process of claim 2 wherein the disperse dye is a lactone dye selected from a group consisting of Yellow 232, Yellow 184 and Yellow 186.

11. The process of claim 2 wherein the disperse dye is a nitrophenylamine dye selected from a group consisting of Yellow 86, Yellow 33 and Yellow 34.

12. The process of claim 2 wherein the disperse dye is a methine dye selected from a group consisting of Blue 354, Yellow 88, Yellow 49, Yellow 93, Yellow 99, Yellow 118 and Yellow 125.

13. The process of claim 2 wherein its disperse dye is an azo dye selected from a group consisting of Red 73, orange 25, Red 50, and Aso 37.

14. The process of claim 2 wherein the disperse dye is an azo dye selected from the group of Red 167, Red 274, Red 74, Red 135, Red 140, Red 155, Violet 33, Brown 18, Red 71, Violet 60 and Red 31.

15. The process of claim 2 wherein the disperse dye is an anthraquinone selected from a group consisting of Blue 77 and Blue 27.

16. The process of claim 2 wherein the disperse dye is an anthraquinone selected from a group consisting of Violet 28, and Violet 38 and Violet 46.

17. The process of claim 1 wherein the alkyl acrylate is present in an amount between 0.5 to 2.5% by weight.

18. The process of claim 1 wherein at least a portion of the ethylene copolymer is grafted onto said polypropylene.

19. The process of claim 1 wherein the ethylene copolymer is melt blended into the polypropylene.

20. The process of claim 1 wherein the ethylene copolymer is ethylene methyl acrylate.

21. The process of claim 1 in which the ethylene copolymer is ethylene ethyl acrylate.

22. A process for dyeing fibers based on polypropylene comprising:

(a) combining polypropylene with an ethylene copolymer of about 70 to 82% by weight ethylene and about 30 to 18% by weight of an ethylene alkyl acrylate wherein the alkyl group has one to four carbon atoms, to form a composition, said alkyl acrylate present in the composition in an amount between 0.2% to 3.0% by weight of the sum of the polypropylene and the ethylene copolymer;

(b) grafting the ethylene copolymer onto the polypropylene to form a grafted composition;

(c) extruding the grafted composition into fibers; and (d) exposing the fibers to a disperse dye sufficient to dye the fibers.

23. The process of claim 22 further including the step of blending a polyamide into the grafted compositions prior to extruding into fibers.

24. The process of claim 22 wherein the alkl acrylate is present in an amount between 1 to 2.5% by weight.

25. The process of claim 22 wherein the ethylene alkyl acrylate is ethylene methyl acrylate.

26. The process of claim 25 wherein the ethylene methyl acrylate has an acrylate component of 20–24%.

27. A colored polyolefin fiber comprising:

(a) about 98 to 70% by weight of a polypropylene;

(b) an ethylene copolymer comprising about 70 to 82% by weight ethylene and about 30 to 18% by weight of an alkyl acrylate wherein the alkyl acrylate has one to four carbon atoms, said alkyl acrylate being present in an amount between 0.2% to 3.0% by weight, wherein at least a portion of said copolymer is grafted onto said polypropylene; and (c) an effective amount of a disperse dye diffused therein sufficient to produce a colored fiber.

28. The fiber of claim 27 wherein the disperse dye is selected from a group consisting of Blue 291, Blue 35, Blue 87, Blue 354, Red 338, Yellow 54, Yellow 86, Yellow 3, Yellow 23, Yellow 232, Intrawhite FWA, Red 60, Yellow 64, Green 9, Blue 79, Red 73, Red 127, Red 167, Blue 183, Blue 118, and Blue 60.

29. The fiber of claim 27 in which the ethylene copolymer is ethylene methyl acrylate.

30. The fiber of claim 27 in which said alkyl acrylate is present in an amount of 0.5 to 2.5% by weight.

31. The fiber of claim 30 wherein the ethylene copolymer is ethylene methyl acylate.

32. A colored polypropylene fiber comprising:

(a) about 98 to 70% by weight of polypropylene;

(b) a selected amount of an ethylene copolymer incorporated into the polypropylene, the ethylene copolymer comprising about 70 to 82 % by weight ethylene and about 30 to 18% by weight of methyl acrylate, said methyl acrylate present in an amount between 0.2 to 3.0% by weight; the ethylene from said ethylene copolymer is present in an amount less than about 10% by weight of the sum of the polypropylene and ethylene copolymer; and (c) an effective amount of a disperse dye diffused into the polypropylene to produce a colored fiber, the disperse dye selected from a group consisting of Blue 291, Blue 35, Blue 87, Blue 354, Yellow 54, Yellow 86, Yellow 3, Yellow 23, Yellow 232, Red 60, Yellow 64, Green 9, Blue 79, Red 73, Red 127, Red 167, Blue 183, Blue 118, Blue 60, Violet 28, Blue 77, Blue 361, and Intrawhite FWA.

33. The colored fiber of claim 32 wherein the disperse dye is an azo dye selected from a group consisting of Yellow 3, Yellow 23, Yellow 50, Yellow 7 and Yellow 68.

34. The colored fiber of claim 32 wherein the disperse dye is an azo dye selected from a group consisting of Blue 102, Blue 106 and Green 9.

35. The colored fiber of claim 32 wherein the disperse dye is an azo dye selected from a group consisting of Blue 291, Blue 281, Blue 19, Blue 94, Blue 171, Blue 139, Blue 125, Blue 130, Blue 122, Blue 146, Blue 200 and Blue 301.

36. The colored fiber of claim 32 wherein the disperse dye is an anthraquinone dye selected from a group consisting of Blue 14, Blue 19, Blue 23, Blue 24, Blue 34, violet 1, violet 4 and violet 6.

37. The colored fiber of claim 32 wherein the disperse dye is an anthraquinone dye selected from a group consisting of Blue 87, Blue 60, Blue 143, Blue 176 and Blue 198.

38. The colored fiber of claim 32 wherein the disperse dye is an anthraquinone dye selected from a group consisting of Red 11, Red 60 and Red 91.

39. The colored fiber of claim 32 wherein the disperse dye is an anthraquinone dye selected from a group consisting of Yellow 54 and Yellow 67.

40. The colored fiber of claim 32 wherein the disperse dye is a lactone dye selected from a group consisting of Yellow 232, Yellow 184 and Yellow 186.

41. The colored fiber of claim 32 wherein the disperse dye is a nitrophenylamine dye selected from a group consisting of Yellow 86, Yellow 33, and Yellow 34.

42. The colored fiber of claim 32 wherein the disperse dye is a methine dye selected from a group consisting of Blue 354, Yellow 88, Yellow 49, Yellow 93, Yellow 99, Yellow and Yellow 125.

43. The colored fiber of claim 32 wherein at least a portion of the ethylene copolymer is grafted onto said polypropylene.

44. The colored fiber of claim 32 wherein the ethylene copolymer is melt blended into said polypropylene.

45. The colored fiber of claim 32 wherein the methyl acrylate is present in an amount of 0.5 to 2.5 % by weight.

* * * * *